United States Patent [19]

Orsini, Jr.

[11] Patent Number: 5,435,207
[45] Date of Patent: Jul. 25, 1995

[54] CAMSHAFT AND METHOD OF MAKING A CAMSHAFT

[75] Inventor: Louis V. Orsini, Jr., Bristol, Conn.

[73] Assignee: The Torrington Company, Torrington, Conn.

[21] Appl. No.: 306,859

[22] Filed: Sep. 15, 1994

Related U.S. Application Data

[60] Continuation of Ser. No. 143,100, Oct. 29, 1993, abandoned, which is a division of Ser. No. 912,432, Jul. 13, 1992, Pat. No. 5,280,675.

[51] Int. Cl.$^6$ .................. B23P 15/00; F16H 53/00
[52] U.S. Cl. ........................ 74/567; 29/888.1; 29/523; 123/90.6; 123/90.27
[58] Field of Search ............ 29/888.1, 527; 74/567; 123/90.6, 90.27

[56] References Cited

U.S. PATENT DOCUMENTS

| | | | |
|---|---|---|---|
| 1,945,092 | 1/1934 | Storer | 29/153 |
| 4,294,100 | 10/1981 | Olschewski et al. | 72/340 |
| 4,597,365 | 7/1986 | Madaffer | 29/888.1 |
| 4,612,695 | 9/1986 | Umeha et al. | 29/505 |
| 4,693,138 | 9/1987 | Hughes et al. | 74/567 |
| 4,781,076 | 11/1988 | Hartnett et al. | 74/567 |
| 4,809,562 | 3/1989 | Bendoraitas et al. | 74/567 |
| 4,847,963 | 7/1989 | Bendoraitas et al. | 29/523 |
| 4,867,004 | 9/1989 | Swars | 74/567 |
| 4,882,825 | 11/1989 | Nakamura | 74/567 X |
| 4,903,543 | 2/1990 | Matt | 74/567 |
| 4,947,547 | 8/1990 | Matt | 29/888.1 |
| 5,052,845 | 10/1991 | Maur et al. | 29/888.1 |
| 5,085,099 | 2/1992 | Hughes | 74/567 |
| 5,136,780 | 8/1992 | Hishida | 74/567 |
| 5,157,832 | 10/1992 | Hughes | 29/888.1 |
| 5,197,351 | 3/1993 | Hishida | 29/888.1 |
| 5,201,247 | 4/1993 | Maus et al. | 74/567 |
| 5,205,187 | 4/1993 | Ebbinghaus | 74/567 |
| 5,259,268 | 11/1993 | Ebbinghaus et al. | 74/567 |
| 5,272,930 | 12/1993 | Nakamura et al. | 29/888.1 X |
| 5,280,675 | 1/1994 | Orsini | 74/567 X |
| 5,299,881 | 4/1994 | Mettler | 74/567 X |
| 5,337,476 | 8/1994 | Orsini | 29/888.1 |

FOREIGN PATENT DOCUMENTS

| | | | |
|---|---|---|---|
| 0291902 | 11/1988 | European Pat. Off. | 74/567 |
| 3521206A1 | 12/1986 | Germany . | |
| 3633435 | 4/1988 | Germany | 74/567 |
| 0189830 | 8/1986 | Japan | 29/888.1 |
| 0267209 | 11/1987 | Japan | 29/888.1 |
| 4-34258 | 2/1992 | Japan | 74/567 |

Primary Examiner—Vinh T. Luong
Attorney, Agent, or Firm—Michael H. Minns

[57] ABSTRACT

A camshaft and method of manufacturing thereof wherein the camshaft has a plurality of thick wall sections and a plurality of thin wall sections. Axially spaced cams are mounted on a hollow tube about the thick wall sections. The thick wall sections are deformed outward to mechanically secure the cams to the hollow tube. The outer diameter of the hollow tube thin wall sections are not deformed when the thick wall sections are deformed.

5 Claims, 3 Drawing Sheets

CAMSHAFT AND METHOD OF MAKING A CAMSHAFT

This application is a continuation of application Ser. No. 08/143,100, filed Oct. 29, 1993, now abandoned, which is a division of application Ser. No. 07/912,432, filed Jul. 13, 1992, now U.S. Pat. No. 5,280,675, issued Jan. 25, 1994.

BACKGROUND OF THE INVENTION

This invention relates generally to camshafts for reciprocating piston engines and more particularly to camshafts and a method of making a camshaft where the cams and shaft are produced as individual elements and are fastened together forming the camshaft.

One method of manufacturing camshafts involves forming the cams separately by methods such as powdered metallurgy. The cams are then fastened to a hollow tube using known fastening processes, such as welding, brazing or expansion of the hollow tube. Bearing or journal surfaces are machined onto the hollow tube between cams. Another method of attaching the cams, described in U.S. Pat. No. 4,858,295, leaves a plurality of projections on the outside of the hollow tube between cams. These projections must be removed in order to form the journal surfaces.

The displacement of material caused by an expander tool during expansion of the hollow tube induces work hardening and stress into the tube. Limiting work hardening reduces the risk of failure due to tube splitting.

The foregoing illustrates limitations known to exist in present camshafts. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a camshaft comprising a monolithic tube having a plurality of spaced apart first portions and a plurality of spaced apart second portions, a first portion being adjacent to a second portion, the inner diameter of the first portions being smaller than the inner diameter of the second portions. A plurality of axially spaced cams are mounted about the rotatable tube, each cam having an axial opening and being positioned about a first portion.

In a second aspect of the present invention, this is accomplished by providing a method of making a camshaft comprising the steps of: providing a hollow tube; forming a plurality of reduced diameter zones on the hollow tube; providing a plurality of cam elements, each cam element including an axial opening; inserting the hollow tube into the cam elements, each cam element being positioned about a reduced diameter zone; and expanding the reduced diameter zones of the hollow tube into mechanical interference engagement with the cam elements.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
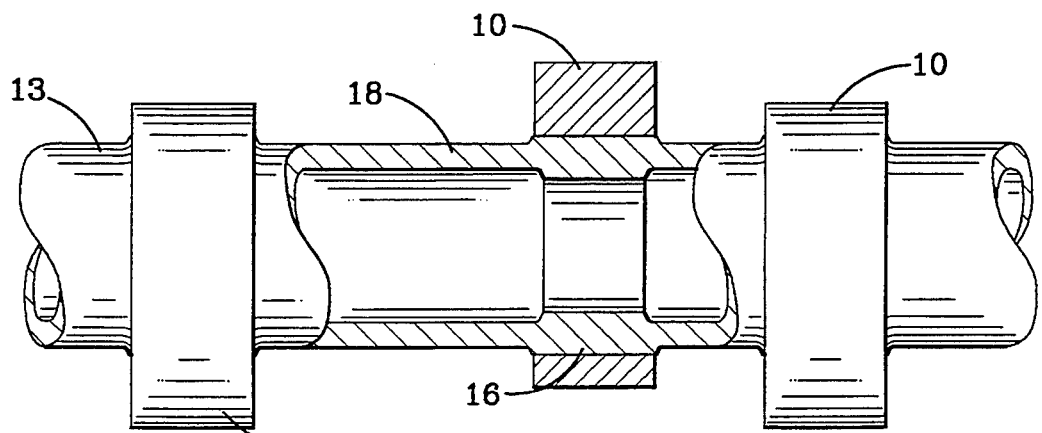
FIG. 1 is a cross section in part of the first embodiment of the camshaft of the present invention.

Referring to the drawings and more particularly to FIG. 1, the manufacture of the camshaft is accomplished by slipping the cams 10 over a hollow tube 13. Other elements (shown as 12 in FIG. 7) in addition to cams 10, may be attached to the hollow tube 13 using this method. This includes timing gears, thrust washers, bearing rings, etc. The hollow tube 13 has a plurality of areas 16 which have a thicker wall thickness than the adjacent areas 18. The cams 10 are positioned about the thicker wall areas 16. Some of the thinner wall areas 18 are used as bearing or journal surfaces. As shown in the FIGURES, the hollow tube 13 including areas 16 is a monolithic structure.

The hollow tube 13 is preferably made of formable steel having a maximum hardness of $R_c30$. The cams 10 are preferably made of steel which is hardenable to a minimum hardness of $R_c55$. Powder forged AISI 4680 series material has also been successfully used as cams 10.

Figure 2:
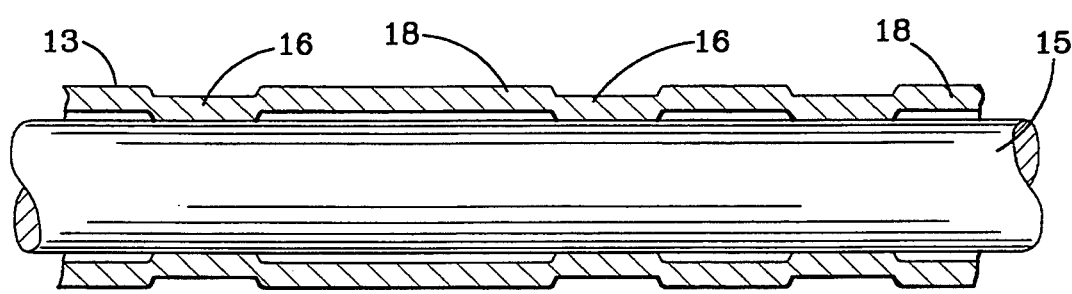
FIG. 2 is a cross section of the hollow tube after the initial forming step.

The thicker areas 16 and the thinner areas 18 are formed by pressing specific areas of the hollow tube 13 to reduce the outer diameter of areas 16, and then machining the hollow tube 13 to a uniform outer diameter. FIG. 2 shows the hollow tube 13 after this pressing has been performed. The preferred method for pressing the hollow tube 13 is swaging. Also shown in FIG. 2 is an internal mandrel 15 which is used to support the inside diameter of the areas 16 when the hollow tube 13 is swaged. The use of internal mandrel 15 is optional. By providing inside support, the final diameter of areas 16 can be better controlled. The areas 16 which are pressed correspond to the location of the cams 10 on the finished product.

The preferred axial length for the thicker areas 16 is slightly less than the axial length of a cam 10. This will minimize or preclude any change in the outer diameter of the thinner areas 18 when the cams 10 are fastened to the hollow tube 13.

Figure 3:
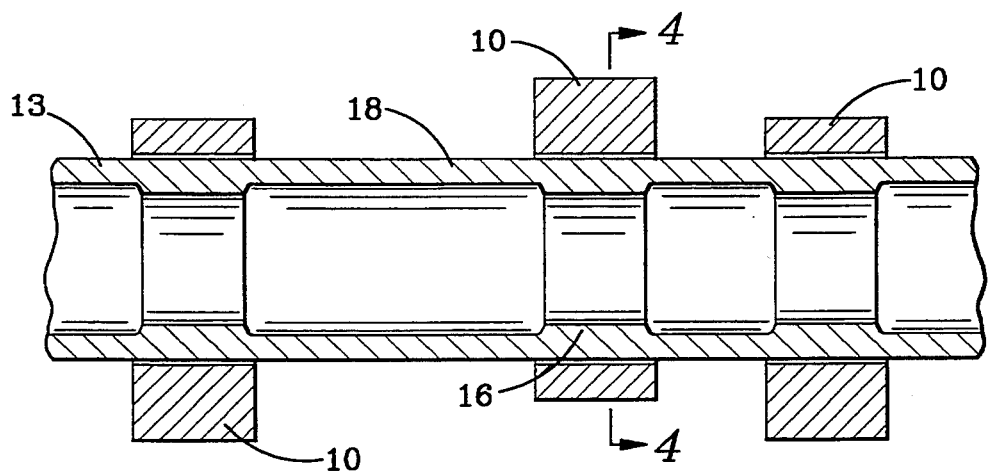
FIG. 3 is a cross section of the hollow tube shown in FIG. 2 after the outer diameter is machined, showing the cams located about the tube.

After the swaging step is performed, the outside diameter of the hollow tube 13 is machined to a uniform outer diameter. The outside of the hollow tube 13 can be finish ground at this time to produce a final surface which acceptable as a bearing or journal surface. Typically, the hollow tube 13 is machined using centerless grinding. Other processes, such as turning, may be used. After this machining step, the hollow tube 13 will have a plurality of thicker wall areas 16 and a plurality of thinner wall areas 18. For typical automobile camshafts, the preferred thickness of thicker wall areas 16 is 0.155 inches and the preferred thickness of thinner wall areas 18 is 0.128 inches. FIG. 3 shows the hollow tube 13 after the tube has been machined to produce a uniform outer diameter. The difference between the wall thickness of the two areas 16, 18 has been exaggerated for clarity. The thicker wall thickness of areas 16 results in the inner diameter of areas 16 being smaller than the inner diameter of areas 18.

Figure 4:
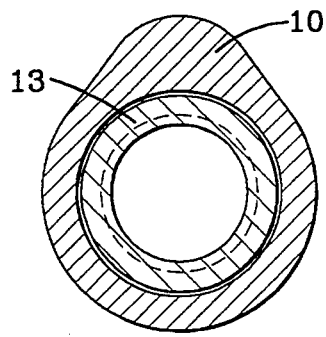
FIG. 4 is a cross section view taken along line 4—4 of FIG. 3.

The cams 10 are then assembled on the hollow tube 13 as shown in FIG. 3. Each cam 10 is aligned with a thicker wall area 16. The axial opening of the cam 10 is slightly larger than the outer diameter of the hollow tube, creating a slight gap between the cam 10 and the tube 13 as shown in FIGS. 3 and 4.

Figure 5:
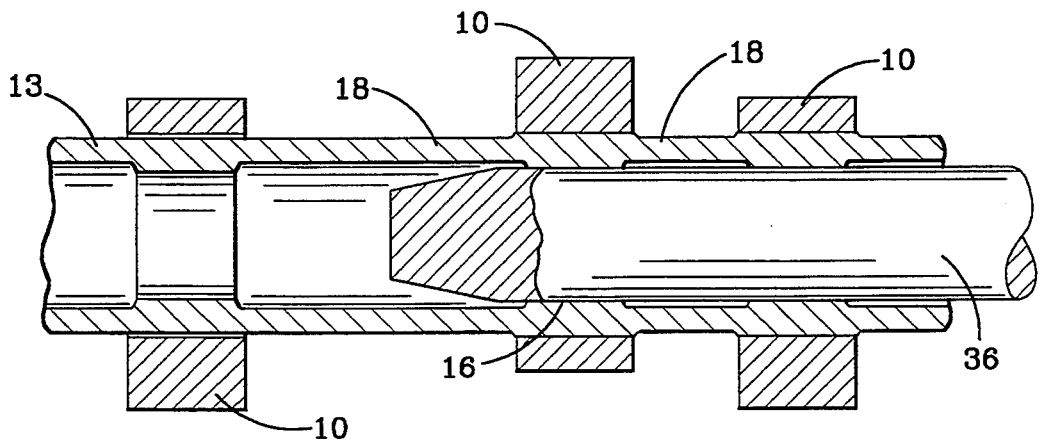
FIG. 5 is a cross section of the camshaft showing the cams after an expander tool has moved partially through the hollow tube.

The cams 10 are held in the proper angular alignment while an expander tool 36 is inserted into the hollow tube 13. FIG. 5 shows the expander tool 36 after it has been inserted past two cams 10. The outer diameter of the expander tool 36 is larger than the inner diameter of the thicker wall areas 16. The outer diameter is also smaller than the inner diameter of the thinner wall areas 18. As the expander tool 36 is inserted into the hollow tube 13, the thicker wall areas 16 are expanded outward into contact with the axial opening of the cam 10. This expansion locks the cams 10 and the hollow tube into mechanical interference engagement, thereby providing axial retention of the cams 10. Since the outer diameter of the expander tool 36 is smaller than the inner diameter of the thinner wall areas 18, these areas are not expanded during the insertion of the expander tool 36. Therefor, these areas 18 typically do not require any additional post assembly machining.

Figure 10:
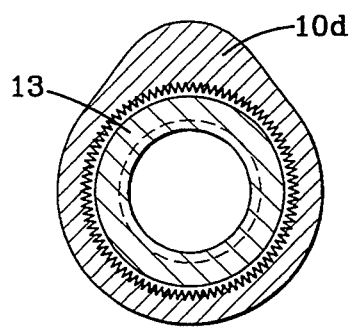
FIG. 10 is a cross section of a cam and hollow tube showing a variation of the present invention.

The surface of the axial opening of a cam 10d may have splines as shown in FIG. 10.

For applications with a variety of elements on the camshaft, cams, timing gears, etc., the degree of expansion needed to secure the element to the camshaft may differ for the different elements. To provide for differing degrees of expansion, the wall thickness of the wall areas 16 can differ. To achieve differing wall thickness, the amount of reduction during the swaging operation can be varied along with the amount of machining after the swaging operation.

Figure 6:
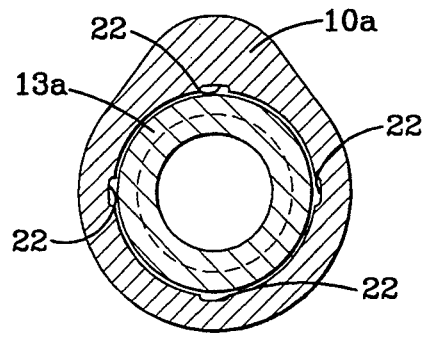
FIG. 6 is a cross section of a cam and hollow tube of a second embodiment of the present invention, taken along line 6—6 of FIG. 7.
Figure 7:
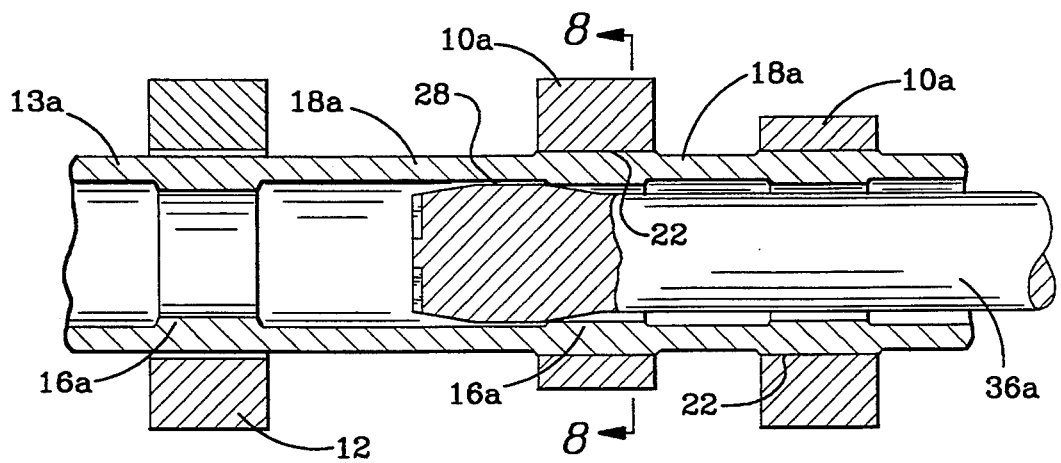
FIG. 7 is a cross section of the camshaft of the second embodiment showing the cams after an expander tool has moved partially through the hollow tube.
Figure 8:
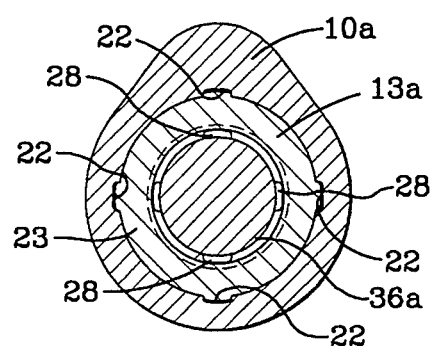
FIG. 8 is a cross section view taken along line 8—8 of FIG. 7.

FIGS. 6 through 8 show a second embodiment of the present invention. Each cam 10a is provided with a plurality of grooves 22 circumferentially spaced about the surface of the axial opening of the cam 10a. The hollow tube 13a is prepared as discussed above to form a plurality of thicker wall areas 16a and thinner wall areas 18a. After the cams 10a are assembled on the hollow tube 13a, an expander tool 36a is inserted into the hollow tube 13a. The expander tool 36 has a plurality of circumferentially separated hard material protrusions 28 adjacent one end of the expander tool 36a. The effective diameter of the protrusions 28 is sufficiently larger than the inside diameter of the thicker wall areas 16a of the hollow tube 13a to cause the protrusions 28 to expand portions of the thicker wall areas 16a into the cam grooves 22 to permanently secure the cams to the hollow tube 13a. The effective diameter of the protrusions 28 is sufficiently smaller than the inside diameter of the thinner wall areas 18a of the hollow tube 13a so that the thinner wall areas 18a are not expanded by the expander tool 36a.

As shown in FIG. 8, the hard material protrusions 28 are positioned so that as the protrusions 28 move within the tube past the cams 10, the hard material protrusions 28 will expand the softer tube material into the grooves 22. As a result of the expansion, the entire circumference of the hollow tube 13a is moved outwardly. Because of the slight difference between the initial outer diameter of the hollow tube 13a and the inside surfaces of the cams 10a, the outside surface of the hollow tube 13a presses tightly against the inside surfaces of the cams 10a. The hard material protrusions 28 form a plurality of circumferentially spaced projections 23 extending radially into grooves 22. The projections 23 extend axially approximately the length of a cam 10.

Any additional elements 12 attached to the hollow tube 13a, such as timing gears, can be attached without grooves 22 on the surface of the axial opening.

Figure 9:
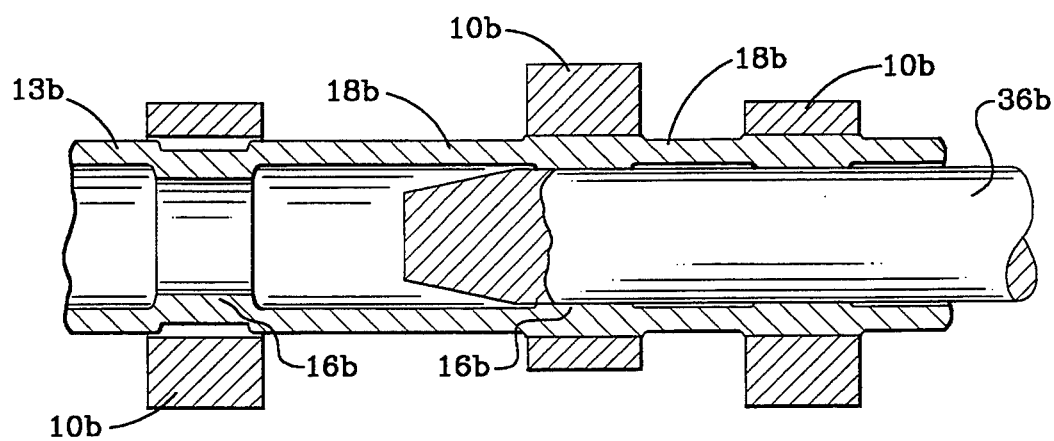
FIG. 9 is a cross section of the camshaft of a third embodiment showing the cams after an expander tool has moved partially through the hollow tube.

FIG. 9 shows a third embodiment of the present invention. In FIG. 9, the hollow tube 13b is not machined to a uniform diameter as is shown in FIG. 3. The reduced diameter zones 16b are formed as discussed above. The outside of the hollow tube 13b may be machined to reduce the diameter of the unreduced areas 18b. However, after machining, the outer diameter of areas 18b remains larger than the outer diameter of areas 16b. The cams 10b are assembled on the hollow tube 13b with the cams 10b being aligned with the reduced diameter areas 16b. The cams 10b are then fastened to the hollow tube 13b by mechanical interference engagement. The inner diameter of the areas 18b is larger than the outer diameter of the expander tool 36b.

Having described the invention, what is claimed is:

1. A camshaft comprising:
   a monolithic tube (13) having a plurality of alternately spaced first portions (16) and second portions (18), each first portion (16) having an inner diameter and an outer diameter, each second portion (18) having an inner diameter and an outer diameter, the inner diameter of said first portions (16) being smaller than the inner diameter of said second portions (18), the outer diameter of said second portions (18) being smaller than the outer diameter of said first portions (16); and
   a plurality of axially spaced cams (10) mounted about the monolithic tube (13), each cam (10) having an axial opening and being positioned about a first portion (16).

2. The camshaft according to claim 1, further comprising:
   a means for securing the cams (10) to the monolithic tube (13).

3. The camshaft according to claim 2 wherein the means for securing comprises a plurality of circumferentially spaced apart grooves (22) on the inner surface of the axial opening of each cam (10); and
   a plurality of circumferentially spaced apart projections (23) extending axially in each first portion (16) of the monolithic tube (13), each projection (23) extending into a groove (22) of each cam (10).

4. A camshaft comprising:

a monolithic tube having a plurality of alternately spaced first portions (16) and second portions (18), each first portion (16) having an inner diameter and a thickness, each second portion (18) having an inner diameter and a thickness, the inner diameter of said first portions (16) being smaller than the inner diameter of said second portions (18), the thickness of said first portions (16) being greater than the thickness of said second portions (18); and a plurality of axially spaced cams (10) mechanically attached to the monolithic tube (13) by expansion of said first portions (16) of the monolithic tube (13), each cam (10) having an axial opening and being positioned about a first portion (16).

5. The camshaft according to claim 4 wherein each cam (10) has a plurality of circumferentially spaced apart grooves (22) on the inner surface of the axial opening; and each first portion (16) has a plurality of circumferentially spaced apart projections (23) extending into the grooves (22) of each cam (10).

* * * * *